(12) United States Patent
Morsi et al.

(10) Patent No.: US 9,396,037 B2
(45) Date of Patent: Jul. 19, 2016

(54) MODEL-BASED DATA PIPELINE SYSTEM OPTIMIZATION

(75) Inventors: Magdi Morsi, Bellevue, WA (US); Wai Ho Au, Redmond, WA (US); Amgad Neematallah, Bellevue, WA (US); Will Xu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1180 days.

(21) Appl. No.: 13/405,362

(22) Filed: Feb. 27, 2012

(65) Prior Publication Data
US 2013/0227573 A1 Aug. 29, 2013

(51) Int. Cl.
G06F 9/50 (2006.01)
G06F 17/30 (2006.01)
G06F 11/34 (2006.01)

(52) U.S. Cl.
CPC .......... *G06F 9/5083* (2013.01); *G06F 11/3409* (2013.01); *G06F 17/30563* (2013.01); *G06F 2209/5022* (2013.01)

(58) Field of Classification Search
CPC ............ G06F 11/3409; G06F 11/3466; G06F 17/30563
See application file for complete search history.

(56) References Cited

U.S. PATENT DOCUMENTS

| | | | |
|---|---|---|---|
| 6,208,990 B1 * | 3/2001 | Suresh et al. | |
| 7,310,801 B2 | 12/2007 | Burkhardt et al. | |
| 2003/0182652 A1 | 9/2003 | Custodio | |
| 2006/0112109 A1 * | 5/2006 | Chowdhary et al. | 707/100 |
| 2006/0212477 A1 | 9/2006 | Murphy et al. | |
| 2006/0218159 A1 | 9/2006 | Murphy et al. | |
| 2007/0174824 A1 | 7/2007 | Relyea et al. | |
| 2007/0234240 A1 * | 10/2007 | Entin et al. | 716/1 |
| 2008/0270350 A1 | 10/2008 | Bojanic et al. | |
| 2009/0043778 A1 | 2/2009 | Jambunathan et al. | |
| 2009/0240348 A1 | 9/2009 | Chand et al. | |
| 2010/0281473 A1 | 11/2010 | Zhang et al. | |
| 2011/0047525 A1 * | 2/2011 | Castellanos et al. | 717/104 |
| 2012/0102007 A1 * | 4/2012 | Ramasubramanian et al. | 707/705 |

OTHER PUBLICATIONS

"ClickOnce Deployment Overview", Retrieved at <<http://msdn.microsoft.com/en-us/library/142dbbz4(v=vs.90).aspx>>, Retrieved Date: Nov. 11, 2011, pp. 4.
Farley, Dave, "The Deployment Pipeline", Retrieved at <<http://continuousdelivery.com/wp-content/uploads/2010/01/The-Deployment-Pipeline-by-Dave-Farley-2007.pdf>>, 2007, pp. 11.
Otey, Michael, "Managing and Deploying SQL Server Integration Services", Retrieved at <<http://msdn.microsoft.com/en-us/library/cc966389.aspx>>, Apr. 3, 2005, pp. 24.
Humble, et al., "Continuous Delivery", Retrieved at <<http://ptgmedia.pearsoncmg.com/images/9780321601919/samplepages/0321601912.pdf>>, Aug. 2010, pp. 80.

* cited by examiner

*Primary Examiner* — William Spieler
(74) *Attorney, Agent, or Firm* — John Jardine; Judy Yee; Micky Minhas

(57) ABSTRACT

A computer-implemented method for optimizing a data pipeline system includes processing a data pipeline configuration manifest to generate a framework of the data pipeline system and a data flow logic package of the data pipeline system. The data pipeline configuration manifest includes an object-oriented metadata model of the data pipeline system. The computer-implemented method further includes monitoring performance of the data pipeline system during execution of the data flow logic package to obtain a performance metric for the data pipeline system, and modifying, with a processor, the framework of the data pipeline system based on the data pipeline configuration manifest and the performance metric.

20 Claims, 5 Drawing Sheets

MODEL-BASED DATA PIPELINE SYSTEM OPTIMIZATION

BACKGROUND OF THE DISCLOSURE

Brief Description of Related Technology

Software developers collect and interpret massive amounts of data regarding how customers use their software products. Software products are often designed with self-monitoring capabilities to produce measurements and other data points regarding the status, condition, action, or other characteristic of the product or its operating environment. Data indicative of actual use can provide insight into issues that arise in certain computing environments. Such data can also indicate whether customers give up using certain features, or develop a workaround to achieve a desired result. Software developers can also see which features are seldom used, even though such features may be useful. The feedback reflects usage patterns that reveal opportunities for future product improvements.

Software developers often rely on data warehouses to process the raw, self-monitoring data generated by each installation of the software product. The data warehouse collects and converts the raw data into more useful formats, etc. By processing the raw data in predefined ways, the data warehouse continuously creates information to support answers to queries posed to the data warehouse regarding how the software product is used in the real world. Such processing makes the data warehouse more responsive than a traditional database of raw data, which processes its contents to develop an answer for each query, an often impractical task when confronting massive amounts of raw data.

The benefits of processing the raw data come at a cost. The data warehouse is carefully configured before beginning to accept incoming data. This configuration, and any reconfiguration needed to support a new set of queries, typically requires the services of one or more data warehousing experts. The cost of configuring and maintaining the data warehouse is often undesirably high. Maintenance is often a considerable challenge, insofar as the data warehouse is frequently adapted for changing uses. The complexity increases when the raw data is generated in enterprise environments, where multiple data types from different sources are merged together for reporting and analysis.

Many data warehouses are configured with extract, transform and load (ETL) pipelines to process and manage the raw data. ETL pipelines may be implemented via code arranged in data flow logic packages. Data flow logic packages are designed to retrieve source data from a source data store, process the data, and store the data in a destination data store.

When new source or destination data stores are added or other details change, the data flow logic packages are changed as well. For example, a column in the source data store may be split into multiple columns, a column name may change, or a server may be renamed or moved to a different location. Maintaining the data warehouse to address such changes often involves significant development resources in connection with large-scale data storage systems.

SUMMARY OF THE DISCLOSURE

Methods and systems are directed to configuring and/or optimizing a data pipeline system. The methods and systems automate configuration and optimization of data pipeline systems.

In accordance with one aspect of the disclosure, the automated configuration or optimization is based on a data pipeline configuration manifest that includes an object-oriented metadata model of the data pipeline system. During configuration, the data pipeline configuration manifest may be processed to generate a framework of the data pipeline system. The framework may then be optimized based on performance of the data pipeline system and the data pipeline configuration manifest. In some embodiments, the optimization includes re-processing the data pipeline configuration manifest in view of the performance of the data pipeline system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWING FIGURES

For a more complete understanding of the disclosure, reference should be made to the following detailed description and accompanying drawing figures, in which like reference numerals identify like elements in the figures.

Figure 1:
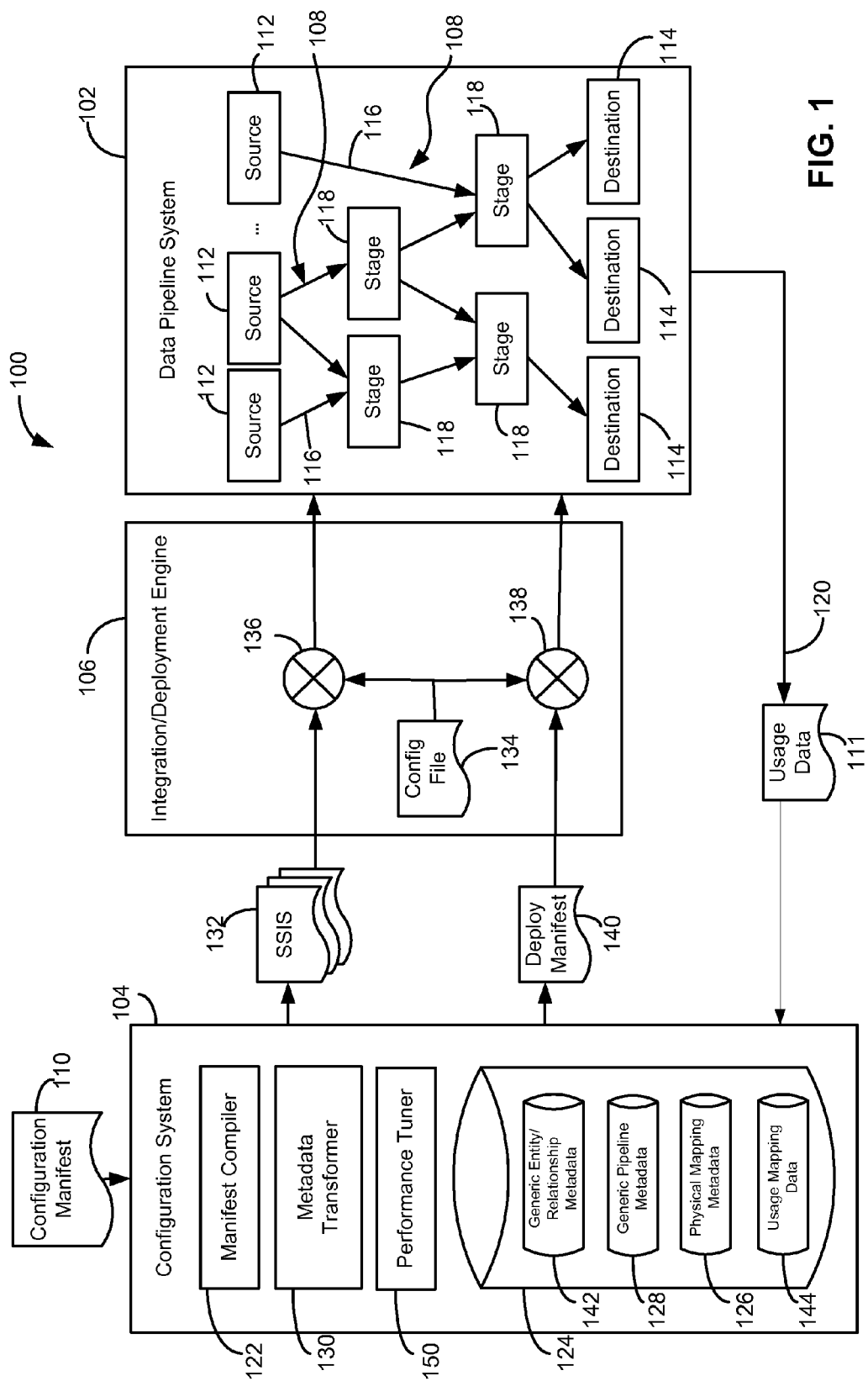
FIG. 1 is a block diagram of an exemplary system having a configuration system configured to optimize a data pipeline system in accordance with one embodiment.

While the disclosed systems and methods are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION

The disclosed methods and systems automate the configuration, maintenance, and optimization of data pipeline systems. The configuration, subsequent maintenance, and optimization of the data pipeline system are based on a data pipeline configuration manifest, which includes or defines an object-oriented metadata model of the data pipeline system. The object-oriented model may be used to generate data flow logic packages of the data pipeline system programmatically. The packages may then be updated as data indicative of the use and performance of the data pipeline system is obtained. The disclosed methods and systems may thus deploy and optimize the data pipeline system in an automated manner. Such automation may attain pipeline consistency in, and support the management of, data pipeline systems that evolve or scale to large sizes (e.g., tens of thousands of tables), for which a manual update process would be too time consuming and error prone.

The object-oriented metadata model supports the documentation of the configuration of the data pipeline system in code. In some embodiments, such code documentation is version controlled. Version control operations may include check-in, validation, rollback, etc. An invalid configuration may be avoided by rolling back to a previous configuration or state. Pipeline consistency may thus be maintained.

The disclosed methods and systems provide a number of benefits in the context of configuring and managing data pipeline systems. For instance, the automated nature of the configuration and maintenance avoids relying on data warehouse developers to prepare highly customized scripts for the data pipeline system. In these and other ways, the disclosed methods and systems address the complexities presented by the data pipeline system, which may grow at an exponential rate.

The disclosed methods and systems may include a configuration system driven by a configuration model. The configuration model may be presented via a data pipeline configuration manifest, which is compiled or otherwise processed by the data pipeline configuration system. The configuration model may define a set of targeted language constructs in a metadata layer later translated to a second metadata layer specifying further details, such as data store types. The second metadata layer may be used during deployment to instruct the configuration system to build, modify or delete a data pipeline. For example, a data pipeline may be configured to include operations on the data in the intermediate or end stages of the pipeline to improve the performance of a data warehouse or other data pipeline system.

The configuration system may also include one or more data lifecycle intelligent management features configured to drive, for instance, a sequence of deployment and/or operational actions to tune the data pipeline system toward improved performance. Such management features may also support validation procedures to support version rollbacks. The disclosed methods and systems provide a mechanism to manage the complexity by self-tuning and other optimization as the data pipeline system becomes more complex. The data pipeline systems may thus be optimized for certain types of queries or common use scenarios.

Although described in the context of data generated in connection with a software product development process, the disclosed methods and systems may be used with a wide variety of source data types, contexts, and applications. The disclosed methods and systems are not limited to the type of content to be stored in the data warehouse or other data stores of the data pipeline system.

The disclosed methods and systems are not limited to a particular type of data pipeline system, and may be used with different types of integration or deployment systems. For example, the disclosed methods and systems are well suited for, but not limited to, use with SQL Server® Integration Services (SSIS) software commercially available from Microsoft Corporation. The disclosed methods and systems may be used to avoid, minimize, or decrease the use of various scripting tools to build data flow logic packages for data pipelines. Rather than create the code of each data flow logic package manually (e.g., a developer's use of the Visual Studio component of the Microsoft® SSIS software), the disclosed methods and systems automate the creation, modification, and/or optimization of the code.

Notwithstanding such wide applicability, the disclosed methods and systems are well suited for the challenges arising in the context of software product development. Software product development teams usually run multiple data pipeline systems in parallel. For example, the product developers may have a development pipeline system directed to gathering data for, e.g., an alpha version of the software product, a testing pipeline system for gathering data for, e.g., a beta version of the software product, a pre-production pipeline system, and a production pipeline system. Although the hardware used to gather the raw data may be similar, each pipeline system may benefit from a customized configuration. For example, different pipeline systems may present different reliability and security concerns or interests.

The disclosed methods and systems automate the maintenance and other management of one or more pipeline systems. Data pipeline developers need not manually update multiple systems as the systems evolve. The disclosed methods and systems include a tunable or otherwise adaptable configuration model with parameter options to allow, for instance, the same pipeline configuration to be adapted to different underlying hardware. In such cases, the adaptable model allows the same pipeline configuration to be deployed over different hardware sets in a consistent fashion.

FIG. 1 depicts a system 100 having an exemplary data pipeline system 102 maintained and otherwise configured by a configuration system 104 constructed in accordance with an exemplary embodiment. The configuration system 104 may be coupled with the data pipeline system 102 via one or more data integration or pipeline deployment engines 106. An exemplary data integration or pipeline deployment engine 106 includes the Microsoft® SSIS integration tools of the SQL Server® database software available from Microsoft Corporation. The data pipeline system 102 includes a set of data pipelines 108, which may be integrated with one another to any desired extent. In some cases, the system 100 includes multiple data pipeline systems 102. The data pipelines 108 of each data pipeline system 102 may be coupled to the configuration system 104 for configuration and management as described herein. In some examples, each data pipeline system 102 (or other subset of the set of data pipelines 108) may be dedicated to processing the data generated by a respective version or other component of an enterprise system.

As described below, the configuration system 104 is operative to configure, maintain, and otherwise manage the configuration of the data pipeline system 102 based on an object-oriented metadata model of the data pipeline system 102 and usage data 111 indicative of use and other operation of the set of data pipelines 108. The object-oriented metadata model is set forth in a data pipeline configuration manifest 110 accessed by, or provided to, the configuration system 104. The data pipeline configuration manifest 110 may provide a description of data sources and transformations for the data pipeline system 102. Processing and re-processing of the data pipeline configuration manifest 110 in view of the usage data 111 automates the initial and ongoing configuration of the data pipeline system 102.

The data pipeline system 102 may be used in connection with, and to collect and aggregate data from, a wide variety of operational systems. In some cases, the operational system may include an enterprise network and/or software system (e.g., a business intelligence software system). Thus, some exemplary contexts to which the data pipeline system 102 may be applied involve the collection and analysis of data indicative of the operation of an enterprise software product by end users. The enterprise software product may be in any one or more stages of development (e.g., pre-production, production, etc.). Each data pipeline 108 of the set of data pipelines 108 may be directed to processing data generated by a respective version of the software product (e.g., alpha, beta, etc.). Each version may correspond with a specific stage of development.

The data pipeline system 102 may, but need not, include or be configured as a data warehouse. A data warehouse may be useful for a data analyst to be able to perform complex queries and analyses (e.g., data mining) on the information without slowing down the operational systems. A data warehouse may also support a variety of commercial business software applications, including, for instance, customer relationship management applications. In some cases, the data pipeline system 102 may act as a central repository of data, which is regularly refreshed by any number of data sources (e.g., the enterprise network or other operational system). Notwithstanding the benefits of data warehouses and the beneficial application of the disclosed methods and systems thereto, the format of the data in the data pipeline system 102 may vary from the standard data warehouse context. The source data may be stored in, for instance, any combination of one or more Extensible Markup Language (XML) files, flat files, databases, blobs in the cloud (e.g., elastic blobs), and various types of data tables. The data may remain in one or more of these formats after processing by the data pipeline system 102.

In this example, each data pipeline 108 of the data pipeline system 102 includes one or more source data stores 112, one or more destination data stores 114, and one or more data transformation logic modules 116 coupling the source data store(s) 112 and the destination data store(s) 114. The source data store(s) 112 may, but need not, be part of the enterprise network or other operational system generating the data to be aggregated and processed by the data pipeline system 102. In this example, each data pipeline 108 also includes one or more intermediate stage data stores 118, each of which may be configured as a source data store and/or a destination data store. A respective one of the data transformation logic modules 116 may accordingly couple any pair of the source data stores 112, the destination data stores 114, and the intermediate stage data stores 118. The data pipeline system 102 may have any number of data pipelines 108, any of which may share any one or more components. For example, two of the data pipelines 108 may share one or more of the source data stores 112, the destination data stores 114, and/or the intermediate stage data stores 118.

Each source data store 112, each destination data store 114, and each intermediate stage data store 118 may include one or more computers, server computers, or other processors, and one or more memories of any type configured to store the data in a variety of formats (e.g., database, flat file, table, etc.). One or more of the source data stores 112, the destination data stores 114, and the intermediate stage data stores 118 may share such processors and memories. The computing architecture of the source data stores 112, the destination data stores 114, and the intermediate stage data stores 118 may vary. The number, type, and other characteristics of the of the source data stores 112, the destination data stores 114, and the intermediate stage data stores 118 may also vary.

The data pipeline system 102 may be configured to implement one or more data extraction, transformation, and load (ETL) workflows. For example, each data pipeline 108 may implement a respective ETL workflow. Each ETL workflow may include a variety of tasks directed to extracting data from sources (e.g., the source data store(s) 112), transforming such data to fit various query or other interests, and loading such data into the destination data store(s) 114. The integration and deployment engine 106 may include one or more ETL development tools to help create the ETL workflows, which may be quite complex. One example of an ETL tool is the SQL Server® Integration Services (SSIS) tool available from Microsoft Corporation. The SSIS tool provides a platform to build the ETL workflows and the data pipelines 108.

The ETL development tool or other component of the integration and deployment engine 106 may group one or more data flow and/or control flow tasks in a data flow logic package. The data flow logic package may hold a variety of logic elements that collectively define a workflow to implement data integration or other data pipeline functionality (e.g., extract, transform, or load data). Each data or control flow task may be an executable element within, for instance, a SQL Server® or other data store environment. Each data or control flow task may be configured to, for example, transfer and/or transform data between different data sources. Each data or control flow task may thus reference one or more of the source data stores 112, destination data stores 114, and intermediate stage data stores 118. Such references may include metadata representative of a physical server, database, or other physical or logical location. Each data flow logic package may include any number of control flow elements (e.g., tasks, containers, precedence constraints) and any number of data flow elements (e.g., sources, transformations, destinations). The content of each data flow logic package may be persisted in Extensible Markup Language (XML) or any other language. In one example, a data flow logic package is an XML file that includes metadata about data sources and data flow tasks. Each data flow task includes a source dataset, a transformation, and a destination dataset. The data flow tasks may run in parallel. At runtime, the data flow logic package is passed to an execution engine, which interprets any related metadata and implements the pumping and transformation of data between the source data store(s) 112 and the destination data store(s) 114.

The configuration system 104 is configured to use and optimize one or more higher level representations (or abstractions or models) of the metadata, logic and/or other elements of the data flow logic packages and, thus, the data pipeline system 102. Such modeling of the elements of the data flow logic packages, and the processing thereof by the configuration system 104, enables the data flow logic packages to be created, configured, deployed, and optimized in an automated manner. One representative metadata layer for the data pipeline system 102 is set forth via the object-oriented metadata model of the data pipeline configuration manifest 110. That metadata layer may then be translated into one or more additional metadata representations of the data pipeline system 102. Such metadata may be generated from the data pipeline configuration manifest 110 during processing thereof.

The configuration system 104 may be coupled with the data pipeline system 102 via one or more communication links, paths, or other interfaces. In the example of FIG. 1, one or more of the communication links includes, or passes through, the integration and deployment engine 106. The communication links include a feedback communication link 120 to return the usage data 111 to the configuration system 104. The usage data 111 is indicative of the use and/or operation of the data pipeline system 102. As described below, the configuration system 104 processes such usage data 111 to update expected usage mapping data of the data pipeline system 104. The configuration system 104 may then use the updated usage mapping data to re-process and/or re-generate the higher level representations of the data pipeline system 102.

In the embodiment of FIG. 1, the configuration system 104 includes a manifest compiler 122 configured to process the data pipeline configuration manifest 110 to generate a framework of the data pipeline system 102. For example, the framework may be a mapping of the data pipeline system 102. Metadata indicative of the physical mapping is generated and stored as described below. Alternatively or additionally, the framework may include metadata reflective of data source binding types, data store types, and/or a physical and/or logical mapping of the data pipeline system 102. The framework may include other types of metadata, as described below. Alternatively or additionally, the manifest compiler 122 may be configured to process the data pipeline configuration manifest 110 to generate pipeline metadata for the data pipeline system 102. While the physical and/or logical mapping may specify a broad framework for the set of data pipelines 108, the pipeline metadata may specify more detailed, yet still generic, information regarding relationships and other characteristics of one or more data pipelines of the set of data pipelines 108. As described further below, the manifest compiler 122 may apply parsing, tokenization, syntax, and semantic analysis to the contents of the data pipeline configuration manifest 110 to generate the pipeline and/or other metadata.

Metadata indicative of the physical and/or logical mapping or other framework of the data pipeline system 102 may be stored within a data store 124 of the configuration system 104. The generic pipeline metadata may also be stored in the data store 124. In this example, the data store 124 includes a physical mapping metadata database 126 and a generic pipeline metadata database 128. Further details regarding the manner in which the data pipeline configuration manifest 110 supports the generation of such metadata is set forth below.

The configuration system 104 of the example of FIG. 1 also includes a data transformer 130, or metadata transformer, to process the framework and generic pipeline metadata. The data transformer 130 may be configured to generate a respective data flow logic package for each data pipeline 108 of the set of data pipelines 108 based on the metadata generated by the manifest compiler 122, such as the generic pipeline metadata and the physical mapping metadata. For example, the data transformer 130 may utilize the physical mapping metadata for the data pipeline system 102 to determine the types and other characteristics of the data pipelines 108 to be created. Alternatively or additionally, the framework metadata may be used to determine the types and other characteristics of the intermediate stage data stores 118 and the destination data stores 114. The generic pipeline metadata may then be used by the data transformer 130 to create a corresponding number of data flow logic packages (e.g., SSIS packages) 132. Further configuration of each data flow logic package 132 may be implemented by the integration and deployment engine 106 in accordance with a package configuration file 134, which may specify server names (e.g., email servers), physical databases, filenames, and other specific details of the components of the data pipeline system 102, such as performance metrics or other runtime settings (e.g., a batch size, or the amount of data to be pulled from one of the source data stores 112 per run). The package configuration file 134 provide an opportunity for later modifications that avoid touching the data flow logic packages 132. The package configuration file 134 may be generated by the integration and deployment engine 106 based on information regarding the physical servers, performance metrics that define batch sizes, and other characteristics of the data pipeline system 102. The information in the package configuration file 134 may be incorporated into the data flow logic packages 132 via an integration tool 136 of the integration and deployment engine 106. The integration and deployment engine 106 may be operable to deploy each fully configured data flow logic package into the data pipeline system 102.

The integration and deployment engine 106 may also be configured to support the provisioning of the data pipeline system 102 in accordance with the higher level representations thereof provided by the configuration system 104. In the example of FIG. 1, the information of the package configuration file 134 is also provided to another integration tool 138 of the integration and deployment engine 106, which is configured to generate provisioning and other deployment instructions for the data pipeline system 102 based on a deployment manifest 140 generated by the configuration system 104. For example, the deployment manifest 140 may include metadata indicative of the number and/or arrangement of intermediate stage data stores 118 and the number and/or arrangement of destination data stores 114. Integration with the information from the package configuration file 134 may then assign server names, file names and other details to the metadata arrangements in preparation for provisioning such servers, etc. The deployment manifest 140 may be generated by the configuration system 104 based on the physical mapping and other metadata produced by the manifest compiler 122.

The manifest compiler 122 may process the data pipeline configuration manifest 110 to generate further metadata that may be used to support the generation of data flow logic packages and/or the deployment manifest 140. As described further below, the data pipeline configuration manifest 110 includes an object-oriented metadata model of the data pipeline system 102. The object-oriented metadata model may be arranged via an entity-relationship schema in which entity objects of the model are associated with one another via relationship metadata. In the example of FIG. 1, the processing of the data pipeline configuration manifest 110 by the manifest compiler 122 may include parsing code in the data pipeline configuration manifest 110 to define each entity object and the relationship metadata. The resulting object definitions and relationship metadata may be stored in a generic entity/relationship metadata database 142 of the data store 124. Each entity object may be configured and used as a primitive, or generic representation, of a table or other data storage element of the data pipeline system 102. In some examples, the data transformer 130 may apply the generic pipeline metadata and the physical mapping metadata to such primitives in connection with building the data flow logic packages 132.

The manifest compiler 122 may include one or more modules for parsing and tokenization, syntax analysis, and generation of abstract syntax trees (AST). Each module may be generated by one or more commercially available engines, such as a parser generator engine (e.g., a LEX/YACC engine). The engine may be fed expected code tokens, syntax rules (e.g., BCNF rules), and actions to generate abstract syntax trees (AST) from code objects. From such information, the engine generates a compiler or interpreter components or modules for processing the data pipeline configuration manifest 110. Such processing may include implementation of semantic analysis of the generated AST, extraction of metadata about an object of the data pipeline configuration manifest 110, and serialization of the metadata for storage in the data store 124. The manifest compiler 122 may also be configured to trigger the data transformer 130 to generate the data flow logic packages 132. Any number of modules may be incorporated into the manifest compiler 110 for parsing, tokenization, syntax analysis, and other functions.

In the embodiment of FIG. 1, the data store 124 also includes a usage mapping database 144 in which the usage data 111 (e.g., data indicative of the use or operation of the data pipeline system 102) is stored. Through the usage data 111, the configuration system 104 monitors the data pipeline system 102 during operation to optimize the data pipeline system 102. The usage data 111 may be provided to the configuration system 104 via one or more of the communication links, such as the feedback communication link 120. The usage data 111 may include a wide variety of data types, including, for instance, query response times, data store sizes, data throughput levels, etc. The manifest compiler 122 processes and re-processes the data pipeline configuration manifest 110 in view of the usage data 111.

During an initial processing of the data pipeline configuration manifest 110, the manifest compiler 122 may use expected usage data. During execution of the data flow logic packages of the data pipelines 108, actual usage data may be generated via logs or other reporting functions or tasks in one or more of the data flow logic packages. After accumulating such actual usage data over a period of time, the usage data may be transferred to the usage mapping database 144 to update the usage data to reflect the performance of the data pipeline system 102.

The usage data may be processed by the data flow logic packages and/or the configuration system 104 to determine one or more performance metrics (e.g., average query response time, data throughput variance, etc.). The performance metrics may vary. Other examples include data flow task execution time, central processing unit (CPU) utilization, input-output (I/O) utilization, memory utilization, most frequent executed queries, numbers of locks and latches at specific time snapshots. Each of these metrics may be analyzed to determine database and other system tuning parameters as described herein. The performance metric(s) and/or the usage data 111 (e.g., unprocessed or raw usage data) may, in turn, be fed as an input to the manifest compiler 122 during processing of the data pipeline configuration manifest 110 to update the physical mapping and other metadata based on the updated usage data to optimize the set of data pipelines 108 based on the usage data.

A scheduling processor or other controller element of the configuration system 104 may be configured to direct the manifest compiler 122 to process the data pipeline configuration manifest 110 at regular or periodic intervals during operation of the data pipeline system 102, in accordance with a predetermined schedule, or any other desired time. Alternatively or additionally, the processing implemented by the configuration system 104 may triggered manually by an operator, or be event-triggered. Thus, in some cases, the data pipeline configuration manifest 110 is re-processed a number of times to optimize the data pipeline system 102 over time.

In some embodiments, the configuration system 104 includes a performance tuner 150 configured to direct the manifest compiler 122 to process the data pipeline configuration manifest 110 and the actual usage data (and/or performance metric(s) derived therefrom) after one or more changes to the data pipeline system 102 have been made as a result of a previous round of processing. The performance tuner 150 may monitor the actual usage data and/or the performance metric(s) derived therefrom to determine whether an improvement was realized. For example, an improvement may be realized if a response time decreases. If performance degrades, then the performance tuner 150 may direct the configuration system 104 to revert back to the previous version or state of the configuration metadata. If the performance improvement is incremental in nature, the performance tuner 150 may direct the configuration system 104 to implement further changes in line with those changes previously implemented. Such changes may include modifications to the physical mapping data to, for instance, add another intermediate stage data store 118 to one of the data pipelines 108, add another redundant data pipeline 108, or add another index to an existing destination data store 114. The data pipeline system 102 may thus be updated in an automated manner while running (e.g., while the data flow logic packages are executing). Eventually, the performance tuner 150 may detect an insignificant improvement in performance. The performance tuner 150 may then be configured to determine that further changes along the lines of the previous changes are unwarranted. In some cases, the performance tuner 150 may provide direction to the data transformer 130 regarding task organization (e.g., which tasks to run in parallel) and load balancing (e.g., which servers to load data from in clustered environments).

The configuration system 104 may be configured to revert the physical mapping or other metadata stored in the data store 124 to a previous version for other reasons, such as if a validation of the data pipeline system 102 fails. To this end, each entity object generated from the processing may have a parameter indicative of the current version of the entity object.

In an alternative embodiment, the performance monitoring underlying the operation of the performance tuner 150 and/or the validation procedure is implemented by a dedicated monitor component of the configuration system 104. The monitor component may be in communication with the data store 124 and the data pipeline system 102 to receive the actual usage data, and may include one or more modules directed to determining performance metrics from the usage data. Alternatively, one or more other components or modules of the configuration system 104 may be configured to determine the performance metrics.

Figure 2:
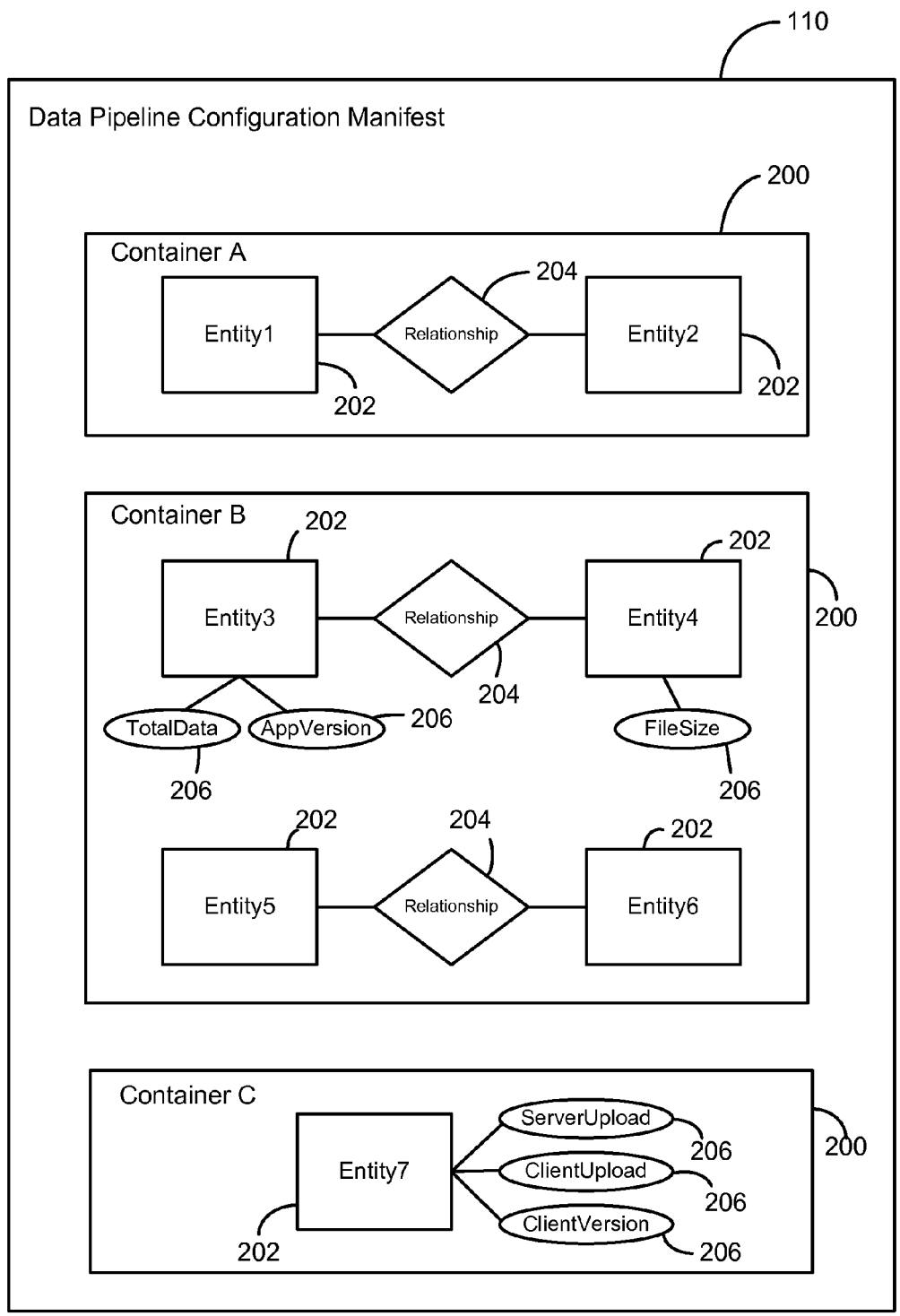
FIG. 2 is a block diagram of an exemplary data pipeline configuration manifest for use with the system of FIG. 1.

FIG. 2 depicts an example of the data pipeline configuration manifest 110. The depiction is in the form of a block diagram for ease in illustration. In some embodiments, the data pipeline configuration manifest 110 may include one or more instruction sets stored in one or more text files. The instruction set(s) may include a list of object definitions. The instruction set(s) may be written in any language. In one example, the language is an extension of structured query language (SQL) underlying one or more versions of the SQL Server® system software (e.g., the object-relational extension provided in SQL:1999). The objects collectively form a metadata model of the data pipeline system 102.

The objects of the model may be defined and arranged in accordance with an entity-relationship modeling technique that produces a conceptual schema of the data pipeline system 102 in a top-down manner. In the depicted embodiment, the metadata model includes container objects 200, entity objects 202, and relationships 204 between such objects. The example of FIG. 2 defines three container objects 200, e.g., ContainerA, ContainerB, and ContainerC. Each container object 200 may include any number of entity objects. Relationships 204 may be formed between any pair of entity objects. The container objects 200 may be used and configured as high-level representations or abstractions of databases or other large or complex data stores. For example, the container object ContainerA may be directed to modeling a particular type of data store, e.g., an Azure data store. The entity objects 202 may be used and configured as high-level representations or abstractions of data tables or other portions or components of a complex data store. The relationships 204 may be used as high-level representations or abstractions of associations between the entity objects 202. For example, certain fields in one of the entity objects 202, Entity 1, of the ContainerA container 200 may be associated via one of the relationships 204 with certain fields in another one of the entity objects 202, Entity 2. The container objects 200, entity objects 202, and relationships 204 are metadata primitives that together form an adaptable system from which the configuration metadata may be generated based on the usage data. Other metadata primitives may be included to support a high-level representation of how pipelines are related. Metadata indicative of each container object 200, entity object 202, and relationship 204 may be stored in the data store 124 (FIG. 1) after the data pipeline configuration manifest 110 is parsed.

In this example, each entity object 202 may have any number of attributes 206, each of which may include, provide or act as an operational or otherwise defining parameter. For example, one attribute may be configured to support later configuration based on a fault tolerance level. A higher fault tolerance level may lead to a data pipeline configuration including more redundancy and, thus, more data pipelines 108 (FIG. 1) and/or more destination data stores 114 (FIG. 1). In this example, two entity objects 202 of the ContainerB container object 200 specify the attributes TotalData, AppVersion, and FileSize, while an entity object 202 of the ContainerC container object 200 specifies ServerUpload, ClientUpload, and ClientVersion attributes 206. The TotalData and FileSize attributes 206 may be directed to supporting use of data amounts as performance metrics during configuration. The AppVersion and ClientVersion attributes 206 may be used to specify a version of the object or other system component (e.g., to support validation procedures and/or rollbacks). The ServerUpload and ClientUpload attributes 206 may be directed to supporting use of upload or other response times as performance metrics during configuration. For example, if the actual usage data reveals that a certain response time exceeds a threshold specified via the attribute 206, then the re-processing of the data pipeline configuration manifest 110 may lead to the formation of additional pipelines 108 (FIG. 1) or other changes to reduce the response time to an acceptable level. Other exemplary attributes may relate to recovery time objective (RTO) times and recovery point objective (RPO) times.

The object-oriented model of the data pipeline configuration manifest 110 may vary from the example shown and described above. Other embodiments may include a different number of levels of objects to provide additional or fewer layers of abstraction or representation. For example, multiple types of data stores may be grouped or otherwise classified into categories, which may then be used to define attributes or other parameters across a wider range of components of the data pipeline system 102.

Compilation of the instruction set(s) defining each of the container objects 200, entity objects 204, relationships 204, and attributes 206 may parse or break the code into tokens, which may be interpreted via one or more techniques. Interpretation may include one or more of semantics analysis, syntax analysis, and binding. For example, one or more objects may be used to define data store binding information for the physical and/or logical mapping metadata. The manner in which the data pipeline configuration manifest 110 is compiled or processed may vary.

Figure 3:
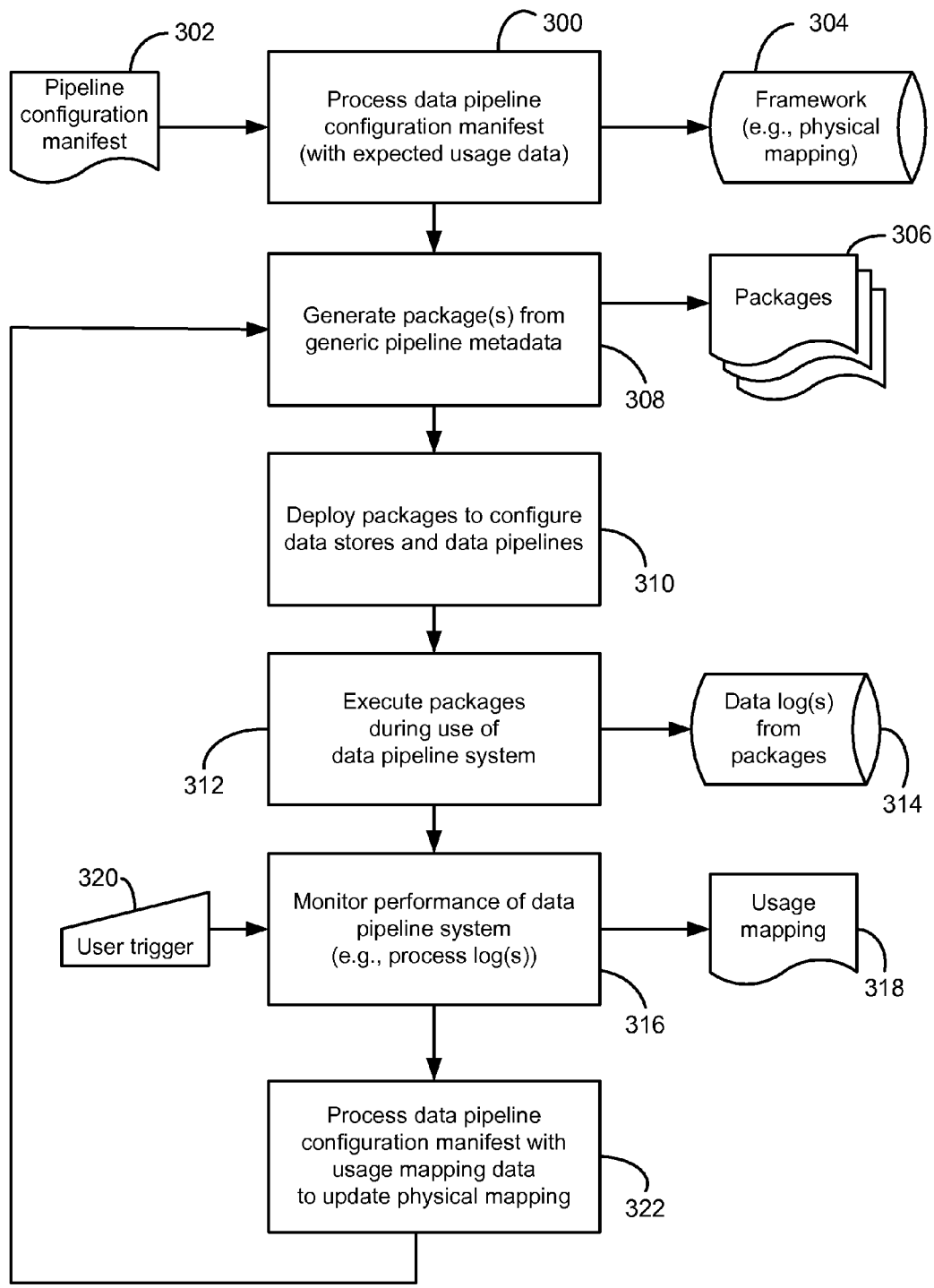
FIG. 3 is a flow diagram of an exemplary computer-implemented method to optimize a data pipeline system in accordance with one embodiment.

FIG. 3 depicts a computer-implemented method for optimizing a data pipeline system in accordance with one embodiment. The method may begin in block 300 with compilation and/or other processing of a data pipeline configuration manifest 302 to generate a framework 304 of the data pipeline system. The data pipeline configuration manifest may include an object-oriented metadata model of the data pipeline system to support the generation of the object metadata underlying the framework. Such processing may be implemented initially with expected usage data for the data pipeline system. The generic pipeline and other object metadata may then be stored in one or more data stores of in communication with the processor(s) or other computing environment(s) implementing the method. SSIS or other data flow logic packages 306 of the data pipeline system may then be generated in a block 308 based on the pipeline and other metadata generated by the processing of the data pipeline configuration manifest. For example, each data flow logic package is created based on the generic pipeline metadata generated during the compilation or other processing. Such generic pipeline metadata may be reflective of the entity objects and relationships defined between such entity objects by the object-oriented metadata model of the data pipeline configuration manifest 302.

Each data flow logic package 306 is then deployed in a block 310 in accordance with the physical mapping metadata generated as a result of the processing in block 300. The physical mapping metadata may be arranged or defined in a deployment manifest as described above. Deployment-specific information such as server names, file names and other details may be integrated into the data flow logic packages 306 via a configuration file or other tool or feature of an ETL or deployment engine or tool. Once deployed, the data flow logic packages 306 are executed during use of the data pipeline system in a block 312. Any number of the data flow logic packages 306 may be configured with logging tasks designed to generate data logs 314 during package execution. The performance of the data pipeline system is monitored in a block 316, which may be implemented concurrently with the block 312. Alternatively, the monitoring may occur on an interval basis, after the log data has been generated, or in any other manner suitable to generate usage mapping data 318 indicative of the use and performance of the data pipeline system. In the example of FIG. 3, the monitoring includes a user trigger 320, via any suitable user interface, that initiates a collection of the log and other use/performance data. Analysis or other processing of the usage mapping data 318 may occur in a variety of ways, including, for instance, those described above.

Following the collection, analysis and/or processing of the usage mapping data 318, the data pipeline configuration manifest 302 is processed again in a block 322 with the usage mapping data 318 to update or otherwise modify the physical mapping metadata used in system deployment. The usage mapping data 318 may correspond with or include any portion of the data collected from the data pipeline system, or any processed form thereof. Upon completing the re-processing of the data pipeline configuration manifest 302, control may return to block 308 for further generation of any data flow logic packages called for by the updated physical mapping. Such data flow logic packages may be configured in accordance with the previously generated generic pipeline metadata, as described above.

In some cases, the collected data is processed during implementation of the block 316 to develop the performance metric(s). In other embodiments, a user trigger is alternatively or additionally relied upon to initiate the re-processing and/or tuning of the data pipeline configuration manifest 302 in accordance with block 322.

Implementation of one or more of the blocks depicted in FIG. 3 is achieved via one or more processors or other computing environments, examples of which are described below. The processor(s) or other computing environment(s) are in communication with the data pipeline system (and any processors or other computing environments thereof). The same processor(s) or computing environment(s) need not be involved or responsible for implementation of each block depicted in FIG. 3. The modification of the physical mapping metadata resulting from the implementation of block 322 is implemented via one or more processors such that the tuning or other optimization of the data pipeline system is achieved in an automated manner.

In some embodiments, the processing of the data pipeline configuration manifest in blocks 300 and 322 includes parsing an object-oriented metadata model that, in turn, establishes an entity-relationship schema of the data pipeline system. One or more parsing procedures may be applied to a list of object definitions in the data pipeline configuration manifest to generate a set of metadata entity objects of the framework of the data pipeline system and to further generate data source binding metadata reflective of relationships between respective metadata entity objects of the set of metadata entity objects. As described above, the processing results in a framework of the data pipeline system that includes a physical mapping of the data pipeline system, generic data storage entities of the data pipeline system, and generic pipelines of the data pipeline system. To those ends, the object-oriented metadata model may include a number of container object definitions, each of which is directed to modeling a data store type. Each data store model may then include one or more entity object definitions to model a data table, column index, or other component or element of the data store. Each entity object definition may include any number of attributes to model configuration parameters of the entity object. For example, the configuration parameters of the data table configuration may establish a set of operational performance properties for an instantiation of an object entity instantiation. In that way, the usage mapping data indicative of the performance of the data pipeline system may be used to tune and otherwise configure the data pipeline system. For example, a property or attribute may be directed to specifying a degree to which the data pipeline system (or a component thereof) is fault tolerant.

Each container object definition specified in the data pipeline configuration manifest 302 may include relationship metadata representative of an association between, for instance, a pair of entity objects. The relationship metadata may include metadata directed to configuring one or more pipeline properties for a data pipeline involving the pair of entity objects.

In embodiments having an object-oriented metadata model as described above, the processing of the data pipeline configuration manifest 302 in blocks 300 and 322 may include generating generic pipeline metadata from the object-oriented metadata model.

In some embodiments, the performance monitoring procedure of block 316 includes updating usage mapping data such that the usage mapping data remains reflective of the use or performance of the data pipeline system. For example, the usage mapping data update may include a delta update in which only changes are recorded, or any changes meeting a certain threshold. The timing, manner, and other characteristics of the determination or generation of the performance metric(s) from the usage mapping data may vary. In some cases, the performance metric(s) are also generated on a delta update basis.

In some embodiments, the processing of the data pipeline configuration manifest in block 322 may include reverting the framework of the data pipeline system to a previous version or state in the event that, for instance, a validation of the data pipeline system fails. Alternatively or additionally, the generation of a modified framework of the data pipeline system in block 322, and the corresponding implementation of one or more of the blocks 308, 310, 312, and 316 may be repeated a desired number of times in accordance with an evaluation of the performance metric(s). The repeated implementation of the blocks 308, 310, 312, 316, and 322 may occur while the data pipeline system is online, e.g., while the deployed data flow logic packages are executing. The data pipeline system need not be brought down to support the evaluation and subsequent adjustments made to the physical mapping metadata directed to optimizing the performance metric(s) and, thus, the data pipeline system. Any number of performance metrics may be involved in the evaluation and tuning.

In embodiments incorporating versioning functionality into the metadata objects of the object-oriented metadata model, the processing of the data pipeline configuration manifest 302 in blocks 300 and 322 may include parsing a list of object definitions in the data pipeline configuration manifest 302, each object definition having an attribute directed to supporting a version parameter. The parsing generates a set of metadata objects for the framework of the data pipeline system. Each metadata object of the set of metadata objects then has a parameter that specifies a version of the framework of the data pipeline system.

Figure 4:
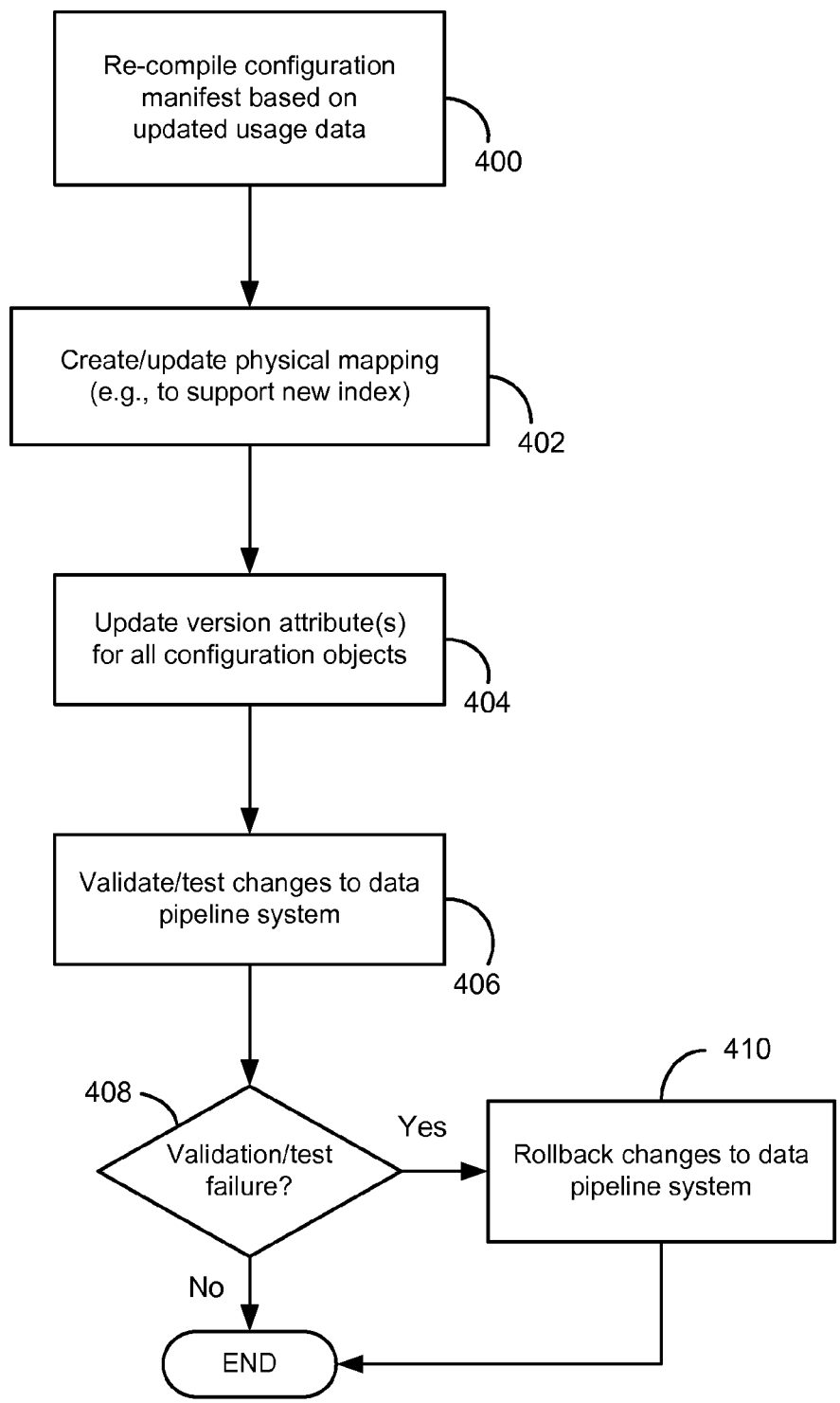
FIG. 4 is a flow diagram of another exemplary computer-implemented method in accordance with one embodiment that may be implemented with the method of FIG. 3 to rollback an update to a data pipeline system.

FIG. 4 depicts further implementation of a data pipeline optimization method in accordance with one embodiment, the further implementation being directed to a rollback or reversion of the data pipeline system to a previous version or state. The method may be implemented in connection with the above-described methods, or as a separate method triggered or otherwise initiated separately. The method of FIG. 4 accordingly need not be implemented by the same processor(s) or computing environment(s) involved in the implementation of the above-described methods.

The method may begin with a re-compilation or other re-processing of a data pipeline configuration manifest in block 400 during the execution of a deployed data pipeline system. The physical mapping metadata is then updated in block 402 in an attempt to address the actual usage mapping data recently collected and used during the re-processing. The update may include storing the metadata associated with the previous deployment (or some representation thereof) in a data store. As described above, the update to the physical mapping metadata may result in some examples in the creation of a new column index to address inadequate response times or unanticipated user queries. Before, or as a part of, deployment in accordance of the updated physical mapping metadata, one or more version attributes of the objects generated by the re-compilation are updated in block 404 to reflect the current deployment. The changes made to the data pipeline system as a result of the update may then be validated or otherwise tested in a block 406. The testing may include a validation procedure directed to whether a failure or other error occurs due to, for instance, an incorrect data source binding, or any other misplaced data pipeline system feature. In some cases, one or more validation procedures of the block 406 may be implemented before deployment or use of the updated data pipeline system. Alternatively or additionally, one or more validation procedures of the block 406 may be implemented after deployment but before use of the data pipeline system.

In some cases, the testing implemented in the block 406 includes optimization testing in addition to, or as an alternative to, the above-described validation testing. The optimization testing includes usage mapping data collection and analysis as described above during use of the updated data pipeline system.

A decision block 408 is configured to detect a failure in any of the above-described testing procedures. The detection efforts may be continuous, or may be implemented upon completion of the testing procedure(s). If an error, failure or other unsuccessful outcome is detected, control passes to block 410, in which the changes occurring as a result of the update are rolled back, and the data pipeline system reverts back to its previous state or version. Implementation of the reversion may include accessing one or more data stores in which the databases or other datasets of previous version metadata are stored. If no error or failure is detected, or if the performance of the data pipeline system improves, then the method may terminate. In some cases, a scheduling processor or other controller may then determine when the method, or another method, such as a tuning method, is implemented.

In some embodiments, the validation and other testing may be implemented in connection with a three-phase procedure in which changes are made in the first phase, validation or other testing occurs in the second phase, and updates to the version attributes are rolled out to all system objects in the third phase.

Figure 5:
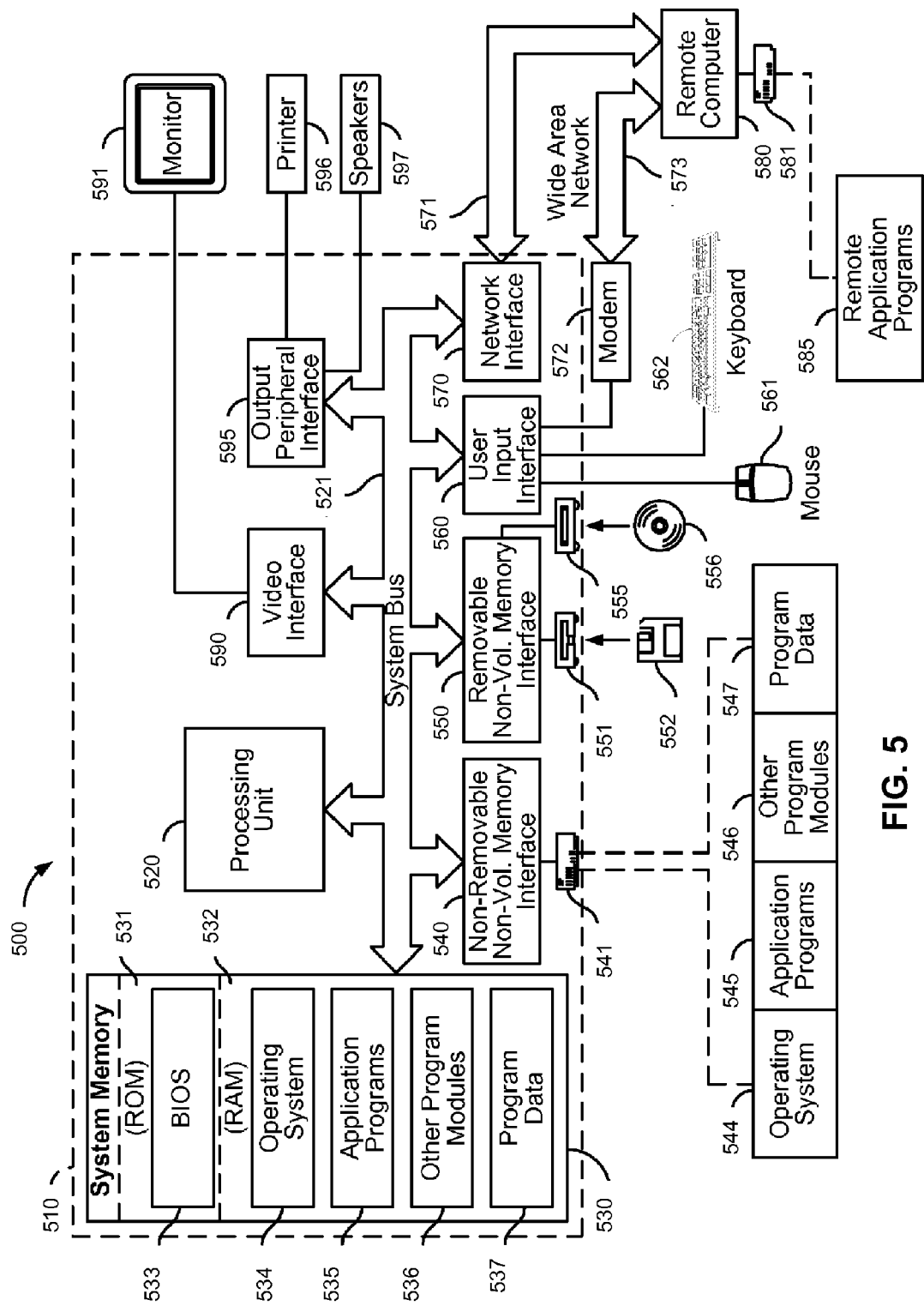
FIG. 5 is a block diagram of a computing environment in accordance with one embodiment for implementation of one or more of the disclosed methods and systems.

With reference to FIG. 5, an exemplary computing environment 500 may be used to implement one or more aspects or elements of the above-described methods and/or systems. For example, the computing environment of FIG. 5 may be used by, or incorporated into, one or more elements of the data pipeline system 102 (FIG. 1), one or more elements of the configuration system 104 (FIG. 1), one or more elements of the integration and deployment engine 106 (FIG. 1). In each case, the computing environment of FIG. 5 may be used or included as a client, network server, application server, or database management system or other data store manager, of any of the aforementioned elements or system components.

The computing environment 500 includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of non-transitory computer readable media. Non-transitory computer readable media may be any available media that may be accessed by computer 510 and includes both volatile and nonvolatile media, removable and non-removable media. By way of example, and not limitation, non-transitory computer readable media may include computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by computer 510.

The system memory 530 includes non-transitory computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537. For example, one or more of the application programs 535 may be directed to implementing the configuration system 102 (FIG. 1), the data pipeline system 104 (FIG. 1), or the integration/deployment engine 106 (FIG. 1). Alternatively or additionally, one or more components of the configuration system 102, such as the manifest compiler 122 (FIG. 1) or the data transformer 130 (FIG. 1), may be implemented via one or more of the other program modules 536. In this or another example, the elements of the data pipeline configuration manifest 110 (FIG. 1) may be stored as program data 537.

Any one or more of the operating system 534, the application programs 535, the other program modules 536, and the program data 537 may be stored on, and implemented via, a system on a chip (SOC). Any of the above-described modules may be implemented via one or more SOC devices. The extent to which the above-described modules are integrated in a SOC or other device may vary.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. These components may either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, touchscreen, ranger sensor or other camera, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

The computing environment 500 of FIG. 5 is only one example of a suitable computing environment and is not intended to suggest any limitation as to the scope of use or functionality of the technology herein. Neither should the computing environment 500 be interpreted as having any dependency or requirement relating to any one or combination of components illustrated in the exemplary operating environment 500.

The technology described herein is operational with numerous other general purpose or special purpose computing system environments or configurations. Examples of well-known computing systems, environments, and/or configurations that may be suitable for use with the technology herein include, but are not limited to, personal computers, server computers (including server-client architectures), hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A computer-implemented method for optimizing a data pipeline system, the method comprising:
    processing a data pipeline configuration manifest to generate a framework of the data pipeline system and a data flow logic package of the data pipeline system, the data pipeline configuration manifest comprising an object-oriented metadata model of the data pipeline system;
    monitoring performance of the data pipeline system during execution of the data flow logic package to obtain a performance metric for the data pipeline system; and
    modifying, with a processor coupled to the data pipeline system, the framework of the data pipeline system based on the data pipeline configuration manifest and the performance metric.

2. The computer-implemented method of claim 1, wherein the object-oriented metadata model comprises an entity-relationship schema of the data pipeline system.

3. The computer-implemented method of claim 1, wherein processing the data pipeline configuration manifest comprises parsing a list of object definitions in the data pipeline configuration manifest to generate a set of metadata entity objects of the framework of the data pipeline system and to further generate data source binding metadata reflective of relationships between respective metadata entity objects of the set of metadata entity objects.

4. The computer-implemented method of claim 1, wherein the framework of the data pipeline system comprises a physical mapping of the data pipeline system, generic data storage entities of the data pipeline system, and generic pipelines of the data pipeline system.

5. The computer-implemented method of claim 1, wherein the object-oriented metadata model comprises a container object definition specifying a model of a data store, the data store model comprising an entity object definition, the entity object definition specifying configuration parameters of a data table of the data store.

6. The computer-implemented method of claim 5, wherein the configuration parameters of the data table configuration establish a set of operational performance properties for an object entity instantiation.

7. The computer-implemented method of claim 5, wherein the container object definition comprises relationship metadata representative of an association between entity objects.

8. The computer-implemented method of claim 7, wherein the relationship metadata comprises pipeline property metadata.

9. The computer-implemented method of claim 1, wherein processing the data pipeline configuration manifest comprises:
    generating generic pipeline metadata from the object-oriented metadata model; and
    creating the data flow logic package based on the generic pipeline metadata.

10. The computer-implemented method of claim 1, wherein monitoring performance of the data pipeline system comprises updating usage mapping data reflective of use of the data pipeline system, wherein the performance metric is based on the updated usage mapping data.

11. The computer-implemented method of claim 10, wherein modifying the framework of the data pipeline system comprises:
generating the performance metric from the updated usage mapping data; and
generating, with the processor, the modified framework of the data pipeline system by re-processing the data pipeline configuration manifest based on the performance metric.

12. The computer-implemented method of claim 1, wherein modifying the framework of the data pipeline system is implemented during the execution of the data flow logic package.

13. The computer-implemented method of claim 1, wherein:
processing the data pipeline configuration manifest comprises parsing a list of object definitions in the data pipeline configuration manifest to generate a set of metadata objects for the framework of the data pipeline system;
each metadata object of the set of metadata objects specifies a version of the framework of the data pipeline system; and
modifying the framework of the data pipeline system comprises reverting the framework of the data pipeline system to a previous version if a validation of the data pipeline system fails.

14. A system for configuring a data pipeline system, the system comprising:
a processor coupled to the data pipeline system;
a memory coupled with the processor;
wherein the memory comprises computer-executable instructions configured for execution by the processor, the computer-executable instructions comprising code to:
process a data pipeline configuration manifest to generate a physical mapping and pipeline metadata for the data pipeline system, the data pipeline configuration manifest comprising an object-oriented metadata model of the data pipeline system;
generate a data flow logic package based on the pipeline metadata;
obtain a performance metric reflective of performance of the data pipeline system as configured in accordance with the physical mapping and during execution of the data flow logic package; and
modify the physical mapping based on the data pipeline configuration manifest and the performance metric.

15. The system of claim 14, wherein the object-oriented metadata model comprises an entity-relationship schema of the data pipeline system.

16. The system of claim 14, wherein the computer-executable instructions comprise further code to update usage mapping data reflective of use of the data pipeline system, wherein the performance metric is based on the updated usage mapping data.

17. The system of claim 14, wherein the computer-executable instructions comprise further code to generate the modified physical mapping of the data pipeline system by re-processing the data pipeline configuration manifest in accordance with the performance metric.

18. The system of claim 14, wherein the computer-executable instructions comprise further code to revert the physical mapping and the pipeline metadata to a previous version if a validation of the data pipeline system fails.

19. A system comprising:
a data pipeline system comprising computer storage media and a set of data pipelines, each data pipeline comprising a source data store, a destination data store, and data transformation logic coupling the source data store and the destination data store;
a configuration system comprising a processing unit, coupled with the data pipeline system and operative to configure the set of data pipelines based on a data pipeline configuration manifest and usage data indicative of use of the set of data pipelines, the data pipeline configuration manifest comprising an object-oriented metadata model of the data pipeline system;
wherein the configuration system comprises a manifest compiler configured to process the data pipeline configuration manifest to generate a physical mapping of, and pipeline metadata for, the data pipeline system, the physical mapping specifying a framework for the set of data pipelines;
wherein the configuration system further comprises a metadata transformer configured to generate a respective data flow logic package for each data pipeline of the set of data pipelines based on the pipeline metadata; and
wherein the configuration system is configured to update the usage data to reflect performance of the data pipeline system during execution of the respective data flow logic package for a respective one of the set of data pipelines and further configured to direct the manifest compiler to re-process the data pipeline configuration manifest to update the physical mapping based on the updated usage data to optimize the set of data pipelines based on the usage data.

20. The system of claim 19, wherein the configuration system is further configured to revert the physical mapping and the pipeline metadata to a previous version if a validation of the data pipeline system fails.

* * * * *